(12) United States Patent
Ramesh et al.

(10) Patent No.: US 8,396,860 B1
(45) Date of Patent: Mar. 12, 2013

(54) ELIMINATING SEQUENCED INNER AND OUTER JOINS USING TEMPORAL SEQUENCED REFERENTIAL INTEGRITY AND TEMPORAL UNIQUENESS

(75) Inventors: Bhashyam Ramesh, Secunderabad (IN); Jalprakash G. Chimanchode, Secunderabad (IN); Sai Pavan Kumar Pakala, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 273 days.

(21) Appl. No.: 12/967,217

(22) Filed: Dec. 14, 2010

(51) Int. Cl.
*G06F 7/00* (2006.01)
*G06F 17/301* (2006.01)

(52) U.S. Cl. .................. 707/713; 707/714; 707/759

(58) Field of Classification Search .............. None
See application file for complete search history.

(56) References Cited

U.S. PATENT DOCUMENTS

2005/0065939 A1* 3/2005 Miao ........................ 707/100
2011/0320419 A1* 12/2011 Johnston et al. ............ 707/703

* cited by examiner

*Primary Examiner* — Pierre Vital
*Assistant Examiner* — Berhanu Mitiku
(74) *Attorney, Agent, or Firm* — Howard Speight

(57) ABSTRACT

A computer receives a query for optimization. The query includes a SEQUENCED join between a temporal parent table and a temporal child table. The parent table has one or more rows. The child table has one or more rows. The parent table has a Primary Key ("PK") column having a value for each row. The parent table has a temporal dimension having a value for each row. The child table has a Foreign Key ("FK") column having a value for each row. The child table has a temporal dimension. The child table's temporal dimension has a value for each row. The computer determines that the query, the parent table, the child table, and the join satisfy a set of CURRENT temporal join elimination criteria. The computer determines that the query, the parent table, the child table, and the join satisfy a set of SEQUENCED temporal join elimination criteria. In response, the computer eliminates the join from the query to produce an optimized form of the query. In further response, the computer executes the optimized form of the query to produce a result. The result has one or more rows. The result has one or more projected columns. The projected columns have values. The result has a temporal dimension. The result's temporal dimension has a value. In further response, the computer stores the result in a memory.

17 Claims, 4 Drawing Sheets

ELIMINATING SEQUENCED INNER AND OUTER JOINS USING TEMPORAL SEQUENCED REFERENTIAL INTEGRITY AND TEMPORAL UNIQUENESS

BACKGROUND

A child-parent referential integrity ("RI") constraint between a parent table and a child table requires that a foreign key value in each child table row have a matching primary key value in a parent table row. In a non-temporal database, some forms of join can be simplified if there is RI between the tables being joined. In some cases, the parent table can be removed from a query involving a join between a child table and a parent table. Such simplifications are a challenge for joins involving temporal tables.

SUMMARY

In one aspect, the invention features a computer-implemented method. The method includes receiving, by the computer, a query for optimization. The query includes a SEQUENCED join between a temporal parent table and a temporal child table. The parent table has one or more rows. The child table has one or more rows. The parent table has a Primary Key ("PK") column having a value for each row. The parent table has a temporal dimension having a value for each row. The child table has a Foreign Key ("FK") column having a value for each row. The child table has a temporal dimension. The child table's temporal dimension has a value for each row. The method further includes determining, by the computer, that the query, the parent table, the child table, and the join satisfy a set of CURRENT temporal join elimination criteria. The method further includes determining, by the computer, that the query, the parent table, the child table, and the join satisfy a set of SEQUENCED temporal join elimination criteria, and in response eliminating, by the computer, the join from the query to produce an optimized form of the query. The response further includes executing, by the computer, the optimized form of the query to produce a result. The result has one or more rows. The result has one or more projected columns. The projected columns have values. The result has a temporal dimension. The result's temporal dimension has a value. The result further includes storing the result in a memory by the computer.

Implementations of the invention may include one or more of the following. The set of SEQUENCED temporal join elimination criteria may include the join including a mechanism to coalesce parent rows having the same value in a parent join column into a single row having a temporal dimension value equal to the merged temporal dimension values of the merged rows. The set of SEQUENCED temporal join elimination criteria may include the join including a mechanism to coalesce result rows having the same value in projected columns into a single row having a temporal dimension value equal to the merged temporal dimension values of the merged rows. The set of SEQUENCED temporal join elimination criteria may include the join including a NORMALIZE ON MEETS clause applied to the parent table. The set of SEQUENCED temporal join elimination criteria may include the join including a NORMALIZE ON MEETS clause applied to the result. The join may include a SEQUENCED inner join. The set of CURRENT temporal join elimination criteria may include the existence of temporal referential integrity ("RI") between the temporal parent table and the temporal child table such that every FK value in the temporal child table exists as a PK value in the parent at the same time. The set of CURRENT temporal join elimination criteria may further include the PK being declared as temporal-unique. The set of CURRENT temporal join elimination criteria may further include the join not accessing any column other than PK columns from the temporal parent table. The set of CURRENT temporal join elimination criteria may further include the join having a predicate of the form PK=FK. The join may be a SEQUENCED outer join, with the parent table being the inner table and the child table being the outer table. The set of CURRENT temporal join elimination criteria may include a temporal parent column in a predicate of the SEQUENCED outer join being temporal-unique. The set of CURRENT temporal join elimination criteria may further include the temporal parent column being the only information accessed from the temporal parent table by the SEQUENCED outer join. The set of CURRENT temporal join elimination criteria may further include all reference to the temporal parent column being in an ON clause of the SEQUENCED outer join. The set of CURRENT temporal join elimination criteria may further include the SEQUENCED outer join being an equality join. The set of CURRENT temporal join elimination criteria may further include the parent table not being accessed by any other join in the SEQUENCED outer join.

In another aspect, the invention features a database system. The database system includes one or more nodes. The database system includes a plurality of CPUs, each of the one or more nodes providing access to one or more CPUs. The database system includes a plurality of virtual processes, each of the one or more CPUs providing access to one or more virtual processes. Each virtual process is configured to manage data, including rows from the set of database table rows, stored in one of a plurality of data-storage facilities. The database system includes a process to receive, by the computer, a query for optimization. The query includes a SEQUENCED join between a temporal parent table and a temporal child table. The parent table has one or more rows. The child table has one or more rows. The parent table has a Primary Key ("PK") column having a value for each row. The parent table has a temporal dimension, the parent table's temporal dimension having a value for each row. The child table has a Foreign Key ("FK") column having a value for each row. The child table has a temporal dimension, the child table's temporal dimension having a value for each row. The process determines, by the computer, that the query, the parent table, the child table, and the join satisfy a set of CURRENT temporal join elimination criteria. The process determines, by the computer, that the query, the parent table, the child table, and the join satisfy a set of SEQUENCED temporal join elimination criteria and in response, the process eliminates, by the computer, the join from the query to produce an optimized form of the query. The response further includes executing, by the computer, the optimized form of the query to produce a result. The result has one or more rows. The result has one or more projected columns. The projected columns have values. The result has a temporal dimension. The result's temporal dimension has a value. The response further includes storing the result in a memory by the computer.

In another aspect, the invention features a computer program, stored in a computer-readable tangible medium. The program includes executable instructions that cause a computer to receive, by the computer, a query for optimization, the query including a SEQUENCED join between a temporal parent table and a temporal child table. The parent table has one or more rows. The child table has one or more rows. The parent table has a Primary Key ("PK") column having a value for each row. The parent table has a temporal dimension. The parent table's temporal dimension has a value for each row. The child table has a Foreign Key ("FK") column having a value for each row. The child table has a temporal dimension. The child table's temporal dimension has a value for each row. The program further includes executable instructions that cause a computer to determine, by the computer, that the query, the parent table, the child table, and the join satisfy a set of CURRENT temporal join elimination criteria. The program further includes executable instructions that cause a computer to determine, by the computer, that the query, the parent table, the child table, and the join satisfy a set of SEQUENCED temporal join elimination criteria and, in response, to eliminate, by the computer, the join from the query to produce an optimized form of the query. In further response, the program executes, by the computer, the optimized form of the query to produce a result. The result has one or more rows. The result has one or more projected columns. The projected columns have values. The result has a temporal dimension. The result's temporal dimension has a value. In further response, the program stores the result in a memory by the computer.

DETAILED DESCRIPTION

Figure 1:
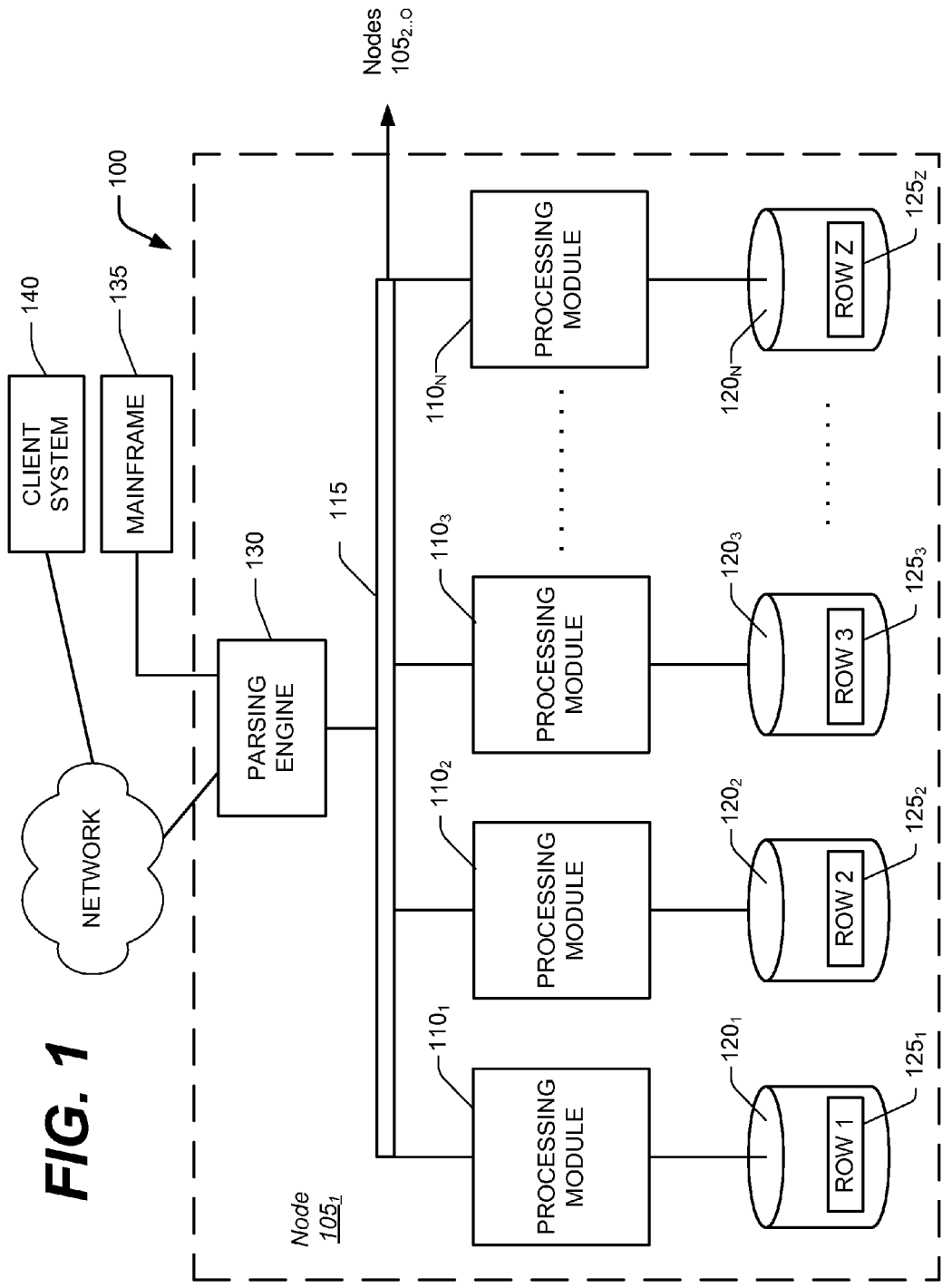
FIG. 1 is one example of a block diagram of a node of a database system.
Figure 2:
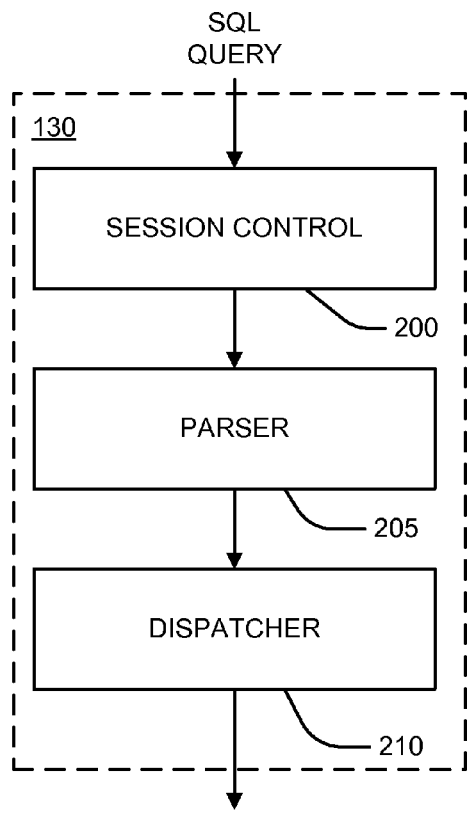
FIG. 2 is one example of a block diagram of a parsing engine.

The technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_1 \ldots N$, connected by a network 115, that manage the storage and retrieval of data in data-storage facilities $120_1 \ldots N$. Each of the processing modules $110_1 \ldots N$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots N$ manages a portion of a database that is stored in a corresponding one of the data-storage facilities $120_1 \ldots N$. Each of the data-storage facilities $120_1 \ldots N$ includes one or more disk drives. The DBS may include multiple nodes $105_2 \ldots N$ in addition to the illustrated node $105_1$, connected by extending the network 115.

The system stores data in one or more tables in the data-storage facilities $120_1 \ldots N$. The rows $125_1 \ldots Z$ of the tables are stored across multiple data-storage facilities $120_1 \ldots N$ to ensure that the system workload is distributed evenly across the processing modules $110_1 \ldots N$. A parsing engine 130 organizes the storage of data and the distribution of table rows $125_1 \ldots Z$ among the processing modules $110_1 \ldots N$. The parsing engine 130 also coordinates the retrieval of data from the data-storage facilities $120_1 \ldots N$ in response to queries received from a user at a mainframe 135 or a client computer 140. The DBS 100 usually receives queries and commands to build tables in a standard format, such as SQL.

In one implementation, the rows $125_1 \ldots Z$ are distributed across the data-storage facilities $120_1 \ldots N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots N$ and associated processing modules $110_1 \ldots N$ by a hash bucket map. The characteristics of the columns chosen for the primary index determine how evenly the rows are distributed.

Figure 3:
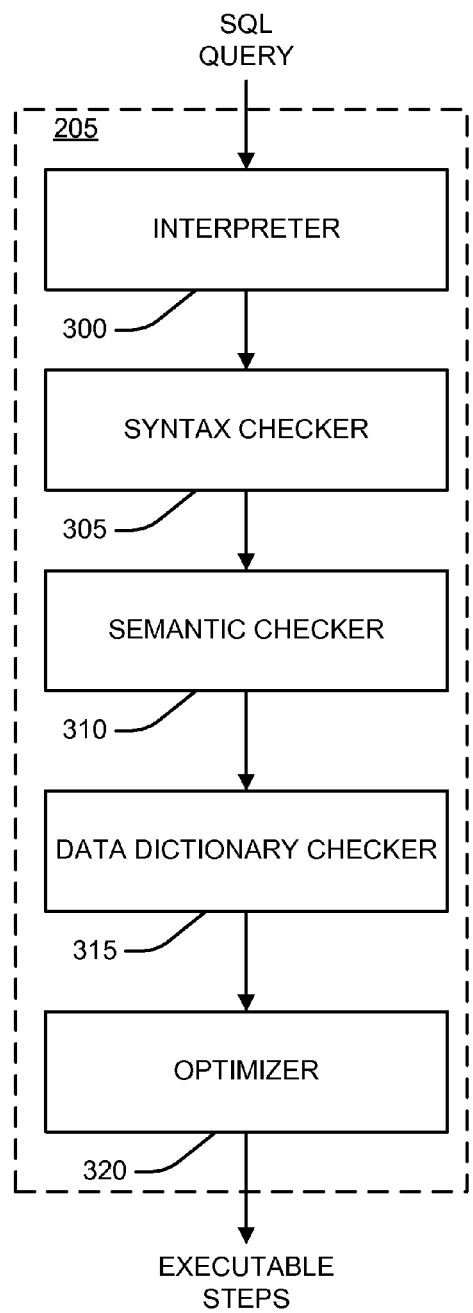
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_1 \ldots N$ to implement the executable steps.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, it stores an inventory history or the movement of employees within an organization. While a conventional database can maintain temporal data, it is typically done using user-defined date or timestamp columns, or the like, which are maintained in a temporal manner with manual coding for data maintenance activities.

In one embodiment, there are three different fundamental kinds of time in a temporal database. The first type is user-defined times that are un-interpreted time values. Such times typically are defined as DateTime data types or Period data types.

In one embodiment, as is conventional, DateTime and Period data types are intrinsic types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time. Indeed, a table can have an arbitrary number of user-defined times that may have meanings to the database, upstream source systems and/or processes, etc.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime. In this application, ValidTime and TransactionTime are referred to as temporal dimensions or temporal columns. In this application, "temporal dimension(s)" and "temporal column(s)" indicates one or both of the temporal dimensions.

A non-temporal table is defined to be a table that has neither ValidTime nor TransactionTime.

In a non-temporal database, some forms of inner join can be simplified if there is a referential integrity (RI) constraint between the tables being joined. An RI is defined between two columns in two tables referred to as the parent table and the child table. The column(s) in the child table is referred to as the Foreign Key (FK) and the column(s) in the parent table as the primary key (PK), where the PK is unique. Furthermore, RI requires that every FK value exist as a value in the PK. In other words, the RI constraint requires that the foreign key values contain only those values that are in the parent table's primary key value. Any violation of this requirement is a violation of RI.

The parent table, and thus the inner join, can be removed from a query involving an inner join between a non-temporal child table and a non-temporal parent table if the following non-temporal inner join elimination criteria are satisfied:
1. There is an RI defined between the two tables being joined and the parent table's PK column(s) is declared as unique.
2. The join, does not access any columns other than the PK column(s) from the parent table
3. The join has a predicate of the form parent-table.pk=child-table.fk In a non-temporal database, outer join elimination can be performed if the following non-temporal outer join elimination criteria are satisfied:
1) the join column(s) in the inner table is guaranteed to be unique;
2) no information other than the inner table's join column(s) is accessed from the inner table by the join;
3) all references in the join to the inner table join column(s) are limited to the ON clause;
4) the join is an equality join; and
5) the inner table does not participate in any other join in the query using explicit user specified join conditions.

These requirements guarantee that the join does not alter the outer table row count or content.

However, in one embodiment, for temporal tables these conditions alone are not sufficient for removing the redundant join. In particular, join elimination of outer joins between non-temporal tables does not require an RI. In contrast, in one embodiment CURRENT and SEQUENCED forms of inner join elimination and SEQENCED forms of outer join elimination require a temporal SEQUENCED RI between the tables involved in the join being eliminated. In one embodiment, CURRENT outer join elimination requires that the join column be temporal-unique, as defined below, but does not require a temporal SEQUENCED RI.

In one embodiment, a temporal SEQUENCED RI is defined between a temporal child table and a temporal parent table. In one embodiment, a temporal SEQUENCED RI requires that the PK column(s) in the parent be temporally unique—see the definition of temporal-unique in the following paragraph. In one embodiment, a temporal SEQUENCED RI requires that the non-temporal RI (described above) should be satisfied at every point in time in a child table row. In other words, in one embodiment, temporal SEQUENCED RI requires: (a) all requirements for non-temporal RI be met and (b) the value of the FK row's temporal column(s) be contained in the value of the parent table's temporal column. In one embodiment, a temporal SEQUENCED RI is between a parent table and a child table that are of the same temporal type. That is, they are both ValidTime tables, both TransactionTime tables, or both bi-temporal tables. In one embodiment, the temporal SEQUENCED RI is between a parent table and a child table in which one of the parent or child tables is a bi-temporal table and the other is not.

Definition of "Temporal-Unique" Columns

A unique column in a temporal table may be different from a unique column in a non-temporal table. In a non-temporal table a column value is unique if only one row in the table has that value—multiple rows cannot have the same value. A temporal table accounts for time in the definition of uniqueness. In one embodiment, a column value in a temporal table is "temporal-unique" if only one row in the table has that value at any one point in time. In one embodiment, two or more rows can have the same value(s) in a temporal-unique column(s) in a ValidTime table as long as the ValidTime values of the two or more rows do not overlap. In one embodiment, two or more rows can have the same value(s) in a temporal-unique column(s) in a TransactionTime table as long as the TransactionTime values of the two or more rows do not overlap. In one embodiment, two or more rows can have the same value(s) in a temporal-unique column(s) in a bi-temporal table as long as the ValidTime values of the two or more rows do not overlap and the TransactionTime values of the two or more rows do not overlap.

In one embodiment, this definition of temporal-unique can be applied in optimizing join queries on a temporal table. This application addresses two such optimization techniques based on temporal-unique column(s).

Join of Snapshot Selections from Two Temporal Tables

One type of join that can be optimized using the technique described in this application is a join of snapshot selections from two temporal tables. The join is a non-temporal join since a snapshot selection results in a non-temporal relation (or table). This form of selection and join is referred to in the literature as CURRENT forms of join or AS OF forms of join.

Join of Temporal Join where Time is Taken into Account

Another type of join that can be optimized using the technique described in this application is a temporal join where time is taken into account. This form of join is sometimes called a SEQUENCED join. In this form of join, rows from two tables that exist at the same instance in time are joined. Therefore the selection and join of rows is based upon the extent to which the rows overlap and the result of the join specifies the duration of the overlap as part of the result.

Optimization of Inner Join

In one embodiment, the parent table in a CURRENT inner temporal join can be eliminated from a query if the following CURRENT temporal inner join elimination criteria are satisfied:

1. there is a temporal SEQUENCED RI between the two tables such that every FK value in the child exists as a PK value in the parent at the same time and the PK value is declared as temporal-unique;
2. the join does not access any column other than the PK column(s) from the parent; and
3. the join has a predicate of the form PK=FK.

Inner temporal join elimination is based on three facts: 1) the guaranteed existence of a unique (single) parent row at each time instance for each child row at that same time instance, 2) no other information is retrieved from the parent, and 3) the join is an equality join.

Optimization of CURRENT Inner Join

In one embodiment, in a snapshot selection followed by a join on temporal tables (i.e., a CURRENT inner join) the first condition is satisfied by the temporal-unique PK requirement and the existence of a temporal SEQUENCED RI between the child and the parent tables on the join column.

Optimization of CURRENT Inner Join—Validtime Tables

For example, consider the following:

```
CREATE MULTISET TABLE vt_p (
  a1 INT,
  b1 INT,
  c1 INT SEQUENCED VALIDTIME UNIQUE NOT NULL,
  vtcol1 period(date) as VALIDTIME NOT NULL
) PRIMARY INDEX ( a1 );
create MULTISET TABLE vt_c (
  a2 INT,
  b2 INT,
  c2 INT SEQUENCED VALIDTIME REFERENCES vt_p(c1),
  vtcol2 PERIOD(DATE) AS VALIDTIME NOT NULL
);
``` and the following query (referred to herein as Query 1):
CURRENT VALIDTIME
SELECT vt_c.*
FROM vt_c, vt_p
WHERE c1=c2;

Note that vt_p and vt_c are ValidTime tables (i.e., they have ValidTime dimensions but not TransactionTime dimensions).

The join in Query 1 satisfies the first CURRENT temporal inner join elimination criterion because an RI exists between vt_p (the parent table) and vt_c (the child table) by virtue of the clause "c2 INT sequenced validtime references vt_p(c1)," which also specifies vt_p.c1 as the PK column in the parent table and vt_c.c2 as the FK column in the child table.

The join in Query 1 satisfies the second CURRENT temporal inner join elimination criterion because it does not access any column other than the PK column (vt_p.c1) in the parent.

The join in Query 1 satisfies the third CURRENT temporal inner join elimination criterion because it has a predicate of the form PK=FK ("c1=c2").

Thus, an optimized version of Query 1 would have no reference to the parent table.

For example, if Query 1 is optimized as a CURRENT query, the result would be as follows:
CURRENT VALIDTIME
SELECT vt_c.*
FROM vt_c Note that the optimized query does not reference the parent table (vt_p).

Optimization of SEQUENCED Inner Joins

Join elimination requires that the number of rows in the result should be unchanged by the join. In one embodiment, this means that the number of rows selected from the parent should not exceed one row per PK value. In one embodiment, this is a reason for the temporal-unique requirement on the PK column(s). In one embodiment, an RI requires that each FK row in the child should have the duration of its temporal dimension(s) contained in the duration of the temporal dimension(s) of the parent row with the matching PK value. In one embodiment, for example, multiple parent PK rows with ValidTime values may MEET such that the UNION of their ValidTime value CONTAINS the child row's ValidTime duration. In one embodiment, this means there may be multiple qualifying parent rows although the parent row is unique at any point in time.

In one embodiment, a SEQUENCED inner join can be eliminated from a query if, in addition to satisfying the CURRENT temporal inner join elimination criteria listed above, it satisfies the following SEQUENCED temporal inner join elimination criterion:

1) the join specifies some mechanism to coalesce the parent rows into a single row such that the ValidTime values of rows with same data values are UNIONed in that row. In one embodiment, the mechanism coalesces all selected parent rows from multiple parent rows with the same column values whose temporal column(s) values MEETS into a single parent row. In one embodiment, the mechanism coalesces the result of the child-parent join such that all result rows of the join with the same column values whose temporal column(s) MEETS into a single result row.

In one embodiment, the mechanism is a NORMALIZE clause. In one embodiment, the NORMALIZE clause coalesces all selected parent columns from multiple parent rows with the same column values whose temporal column(s) value meets into a single parent row. An example syntax for such a NORMALIZE clause is:

```
SEQUENCED [VALIDTIME or TRANSACTIONTIME or both]
  SELECT [list of selected columns]
    FROM [child_table], [parent_table] NORMALIZE
      ([parent_table value columns to be checked for
      the same value], [parent_table ValidTime column
      or TransactionTime column or both columns]) ON
      MEETS
    WHERE [predicate];
```

In one embodiment, the NORMALIZE clause coalesces the result of a child-parent join such that all result rows of the join with the same column values whose temporal column(s) value MEETS into a single row. An example syntax for such a NORMALIZE clause is:

```
SEQUENCED [VALIDTIME or TRANSACTIONTIME or both]
  SELECT [list of selected columns]
    FROM [child_table], [parent_table]
```

```
WHERE [predicate]
NORMALIZE ([result value columns to be checked for the
    same value], [result ValidTime column or
    TransactionTime or both columns) ON MEETS;
```

In one embodiment, the "result value columns to be checked for the same value" is implied to be the "list of selected columns" (or "select list") and the "result ValidTime column or TransactionTime or both column" is implied to be the result's ValidTime column in the case of a ValidTime query, the result's TransactionTime column in the case of a TransactionTime query, and both in the case of a bi-temporal query, and those values are not specified in the query (i.e., the normalize clause merely reads "NORMALIZE ON MEETS"). In one embodiment, only one of the parameters said to be implied in the previous sentence is implied and the parameter that is not implied is specified in a query. In one embodiment, neither parameter is implied and both are specified in a query. In the examples below, both parameters are implied.

In one embodiment, the "result value columns to be checked for the same value" are all of the columns in the "list of select columns," in which case the NORMALIZE clause applies to the entire query. In one embodiment, the "result value columns to be checked for the same value" is, for example, the columns involved in one join in a multi-join query, so that the NORMALIZE clause applies only to the result of the one join in the multi-join query, which may be an intermediate result of the query.

Optimization of SEQUENCED Inner Join—Validtime Tables

Consider, for example, the following ValidTime table definitions:

```
CREATE MULTISET TABLE vt_p(
p1 INT,
p2 INT,
parentcol INT SEQUENCED VALIDTIME UNIQUE NOT NULL,
vtcol1 PERIOD(DATE) AS VALIDTIME NOT NULL
) PRIMARY INDEX ( p1 );
CREATE MULTISET TABLE vt_c(
c1 INT,
c2 INT,
childcol INT SEQUENCED VALIDTIME REFERENCES
vt_p(parentcol),
vtcol2 PERIOD(DATE) AS VALIDTIME NOT NULL
) PRIMARY INDEX ( c1 );
``` and the following query (Query 2):

```
SEQUENCED VALIDTIME
    SELECT vt_c.*
        FROM vt_c, vt_p NORMALIZE (parentcol, vtcol1) ON MEETS
        WHERE vt_p.parentcol = vt_c.childcol;
```

Assume that vt_p and vt_c are populated as shown below:

TABLE 1 vt_p

| p1 (PI) | p2 | parentcol (PK) | vtcol1 begin | vtcol1 end |
|---|---|---|---|---|
| 1 | 1 | 1 | t1 | t2 |
| 1 | 1 | 2 | t2 | t3 |
| 1 | 2 | 2 | t3 | end of time |

TABLE 2 vt_c

| c1 (PI) | c2 | childcol (FK) | vtcol2 begin | vtcol2 end |
|---|---|---|---|---|
| 1 | 1 | 1 | t1 | t2 |
| 1 | 1 | 2 | t2 | end of time |

The join in Query 2 satisfies the first CURRENT temporal inner join elimination criterion because an RI exists between vt_p (the parent table) and vt_c (the child table) by virtue of the clause "childcol INT SEQUENCED VALIDTIME REFERENCES vt_p (parentcol)," which also specifies vt_p.parentcol as the PK column in the parent table and vt_c.childcol as the FK column in the child table.

At first glance, it appears that the first CURRENT temporal inner join elimination criterion is not satisfied by the join in Qeury 2. It appears that temporal SEQUENCED RI is violated for the vt_p and vt_c as shown above because the ValidTime range for the second row of vt_c is not CONTAINED by the ValidTime range of any single row of vt_p. In one embodiment, the database system does not enforce temporal SEQUENCED RI and such a situation is allowed to exist. In one embodiment, the database system enforces temporal SEQUENCED RI and recognizes that only the PK-FK relationship and the relationship between the ValidTime dimensions of the parent and child tables are necessary to form the temporal SEQUENCED RI and that normalization is available to resolve any mismatches between the ValidTime dimensions. In the example shown, the equality of parentcol in the last two rows of vt_p and the fact that the ValidTimes of those two rows MEET (i.e., are contiguous and non-overlapping) allows the database system to combine those two rows for the purposes of temporal SEQUENCED RI resulting in a row that CONTAINS the last row of vt_c.

In addition, the PK column (vt_p.parentcol) is declared as temporal-unique. Thus, the first CURRENT temporal inner join elimination criterion is satisfied.

The join in Query 2 satisfies the second CURRENT temporal inner join elimination criterion because it does not access any column other than the PK column (vt_p.parentcol) in the parent.

The join in Query 2 satisfies the third CURRENT temporal inner join elimination criterion because it has a predicate of the form PK=FK ("vt_p.parentcol=vt_c.childcol").

The join in Query 2 satisfies the SEQUENCED temporal inner join elimination criterion because the join specifies a mechanism to coalesce the parent rows into a single row such that the ValidTime values of rows with same data values are UNIONed in that row, i.e., the NORMALIZE ON MEETS clause, as discussed above.

Thus, the parent table and the inner join can be eliminated from Query 2.

In one embodiment, optimization of the application of Query 2 to vt_p and vt_c would first consider normalizing vt_p as described above, resulting in a one-to-one relationship between the rows of vt_p and vt_c. In one embodiment, the one-to-one relationship would allow the optimizer to eliminate vt_p from the query, to produce the following optimized version of Query 2:

```
SEQUENCED VALIDTIME
    SELECT vt_c.*
        FROM vt_c
;
```

Consider another query (Query 3):

```
SEQUENCED VALIDTIME
    SELECT vt_c.*
        FROM vt_c, vt_p
        WHERE vt_p.parentcol = vt_c.childcol
        NORMALIZE ON MEETS;
```

In Query 3, in one embodiment, the location of the NORMALIZE ON MEET clause at the end of the query means that it is applied to the result of the child-parent join. In one embodiment, the NORMALIZE clause coalesces the result of the child-parent join such that all result rows of the join whose ValidTime values MEET into a single result row. The result of the join will be multiple child rows whose data values are the same but with different ValidTime values that MEET which can be coalesced into one row.

Applying Query 3's parent-child join to the parent and child tables shown above produces the following result:

TABLE 3

| result | | | | |
|---|---|---|---|---|
| c1 | c2 | childcol | vtcol2 begin | vtcol2 end |
| 1 | 1 | 1 | t1 | t2 |
| 1 | 1 | 2 | t2 | t3 |
| 1 | 1 | 2 | t3 | end of time |

Normalizing the result per the NORMALIZE ON MEETS clause combines the last two rows of the result, producing a result that is identical to vt_c.

In addition, the PK column (vt_p.parentcol) is declared as temporal-unique. Thus, the first CURRENT temporal inner join elimination criterion is satisfied.

The join in Query 3 satisfies the second CURRENT temporal inner join elimination criterion because it does not access any column other than the PK column (vt_p.parentcol) in the parent.

The join in Query 3 satisfies the third CURRENT temporal inner join elimination criterion because it has a predicate of the form PK=FK ("vt_p.parentcol=vt_c.childcol").

The join in Query 3 satisfies the SEQUENCED temporal inner join elimination criterion because the join specifies a mechanism to coalesce the rows of the join results with the same data values into a single row with a ValidTime value equaling the UNION of the ValidTime values of the coalesced rows, i.e., the NORMALIZE ON MEETS clause, as discussed above.

Thus, the parent table and the inner join can be eliminated from Query 3.

In one embodiment, optimization of the application of Query 3 to vt_p and vt_c would recognize that a temporal SEQUENCED RI exists between vt_p and vt_c, that normalization after the join is performed will produce a result that is identical to the vt_c, and will optimize by eliminating vt_p from the query, thereby eliminating the inner join from the query to produce the following optimized version of Query 3:

```
SEQUENCED VALIDTIME
    SELECT vt_c.*
        FROM vt_c
;
```

Optimization of SEQUENCED Inner Join—Transaction-Time Tables

Consider the following TransactionTime table definitions:

```
CREATE MULTISET TABLE tt_p(
p1 INT,
p2 INT,
parentcol INT SEQUENCED TRANSACTIONTIME UNIQUE NOT
NULL, ttcol1 PERIOD(TIMESTAMP(6) WITH TIME ZONE ) AS
TRANSACTIONTIME NOT NULL
) PRIMARY INDEX ( p1 );
CREATE MULTISET TABLE tt_c(
c1 INT,
c2 INT,
childcol INT SEQUENCED TRANSACTIONTIME REFERENCES WITH
NO CHECK OPTION tt_p(parentcol),
ttcol2 PERIOD(TIMESTAMP(6) WITH TIME ZONE ) AS
TRANSACTIONTIME NOT NULL
) PRIMARY INDEX ( c1 );
``` and the following query (Query 4):

```
SEQUENCED TRANSACTIONTIME
    SELECT tt_c.*
        FROM tt_c, tt_p NORMALIZE (parentcol, ttcol1) ON MEETS
        WHERE tt_p.parentcol = tt_c.childcol;
```

Assume that tt_p and tt_c are populated as shown below:

TABLE 4

| tt_p | | | | |
|---|---|---|---|---|
| p1 (PI) | p2 | parentcol (PK) | ttcol1 begin | ttcol1 end |
| 1 | 1 | 1 | t1 | t2 |
| 1 | 1 | 2 | t2 | t3 |
| 1 | 2 | 2 | t3 | end of time |

TABLE 5

| tt_c | | | | |
|---|---|---|---|---|
| c1 (PI) | c2 | childcol (FK) | ttcol2 begin | ttcol2 end |
| 1 | 1 | 1 | t1 | t2 |
| 1 | 1 | 2 | t2 | end of time |

In one embodiment, the same principles described above for ValidTime tables apply to Query 4 as well. The optimizer would recognize that normalization would combine the last two rows of tt_p resulting in a one-to-one relationship between tt_p and tt_c, justifying the elimination of tt_p, and thus the inner join, from the query producing the following optimized version of Query 4:

```
SEQUENCED TRANSACTIONTIME
    SELECT tt_c.*
        FROM tt_c
;
```

Consider the following query (Query 5):

```
SEQUENCED TRANSACTIONTIME
    SELECT tt_c.*
    FROM tt_c, tt_p
    WHERE tt_p.parentcol=tt_c.childcol NORMALIZE ON MEETS;
```

The same principles apply here as described above for ValidTime tables. Optimization of the application of Query 5 to tt_p and tt_c would recognize that a temporal SEQUENCED RI exists between tt_p and tt_c, that normalization after the join is performed will produce a result that is identical to the tt_c, and will optimize by eliminating tt_p from the query, thereby eliminating the inner join from the query to produce the following optimized version of Query 5:

```
SEQUENCED TRANSACTIONTIME
    SELECT tt_c.*
        FROM tt_c
    ;
```

Optimization of SEQUENCED Inner Join—Bi-Temporal Tables

The same principles apply to bi-temporal tables.

Outer Join Elimination

The criteria for non-temporal outer join elimination are described above.

Optimization of CURRENT Outer Join

For a query including a snapshot selection followed by an outer join on temporal tables (i.e., a CURRENT outer join), the inner table can be eliminated if the query satisfies the non-temporal outer join elimination criteria set out above and the inner table join column is declared to be unique.

For example, consider the definitions of tables vt_p and vt_c above and the following definition of vt_3:

```
CREATE MULTISET TABLE vt_3(
a3 INT,
b3 INT,
c3 INT,
vtcol3 PERIOD (DATE) AS VALIDTIME NOT NULL
);
``` and the following query (Query 6):
CURRENT VALIDTIME
SELECT vt_3.*
FROM vt_3 LEFT OUTER JOIN vt_p ON c1=c3.

In this example, the first condition is satisfied because the join column (vt_p.c1) of the inner table (vt_p) is temporal-unique by virtue of the SEQUENCED VALIDTIME UNIQUE clause in the definition of vt_p.c1.

The second condition is satisfied because only the inner table's join column (vt_p.c1) is accessed in the join.

The third condition is satisfied because the references to the inner table join column (vt_p.c1) is limited to the ON clause of the join.

The fourth condition is satisfied because the join is an equality join ("c1=c3").

The fifth condition is satisfied because the inner table (vt_p) does not participate in any other join using explicit user specified join conditions.

Because the above conditions are satisfied, an optimized version of Query 6 would have no reference to the inner table.

For example, if Query 6 is optimized as a CURRENT query, the result would be as follows:
CURRENT VALIDTIME SELECT vt_3.a3, vt_3.b3, vt_3.c3
FROM vt_3;

Note that the optimized query does not reference the inner table vt_p.

Optimization of SEQUENCED Outer Join

For a SEQUENCED form of outer join, the inner table, and thus the outer join, can be eliminated if the above non-temporal outer join elimination criteria are satisfied and the following SEQUENCED temporal outer join elimination criteria are satisfied:

1) there is a temporal SEQUENCED RI between the outer table as a child table and the inner table as a parent table (the RI is on the join column);
2) the join specifies some mechanism to coalesce the parent rows into a single row such that the values of temporal dimension(s) of rows with the same data values are UNIONed in that row. The idea is to coalesce all selected parent rows from multiple parent rows whose temporal dimension(s) MEETS into a single parent row with the same column values or to coalesce the result of the child-parent join such that all result rows of the join whose temporal dimension(s) MEETs are combined into a single result row. In one embodiment, the mechanism is a NORMALIZE clause as described above.

Optimization of SEQUENCED Outer Join—ValidTime Tables

Consider the following query (Query 7) applied to vt_p and vt_c as defined and populated above:

```
SEQUENCED VALIDTIME
    SELECT vt_c.*
        FROM vt_c LEFT OUTER JOIN vt_p NORMALIZE (parentcol,
            vtcol1) ON MEETS
            ON vt_p.parentcol = vt_c.childcol ;
```

Query 7 includes a left outer join between an outer table (vt_c) and an inner table (vt_p). Note that although analysis of left outer joins is described below, similar analyses apply to right outer joins.

The first non-temporal outer join elimination criterion is satisfied because the join column in the inner table (vt_p.parentcol) is guaranteed to be unique because of its definition as VALIDTIME UNIQUE. In fact that definition defines vt_p.parentcol as temporal-unique.

The second non-temporal outer join elimination criterion is satisfied because no information other than the inner table's join column (vt_p.parentcol) is accessed from the inner table by the join.

The third non-temporal outer join elimination criterion is satisfied because the only reference in the join to the inner table join column is in the ON clause.

The fourth non-temporal outer join elimination criterion is satisfied because the join is an equality join (vt_p.parentcol=vt_c.childcol).

The fifth non-temporal outer join elimination criterion is satisfied because the inner table (vt_p) does not participate in any other join in the query.

The first temporal outer join elimination criterion is satisfied because there is a temporal SEQUENCED RI between the outer table (vt_c) as a child table and the inner table (vt_p) as a parent table with the RI on the join column by virtue of the REFERENCES vt_p (parentcol) clause in the definition of vt_c.childcol. This clause creates a temporal SEQUENCED RI between vt_c.childcol and vt_p.parentcol.

The second temporal outer join elimination criterion is satisfied by the NORMALIZE ON MEETS clause in Query 7. Ignoring for a moment the NORMALIZE ON MEETS clause, the LEFT OUTER JOIN specified in Query 7 will produce a result in which the projected elements of all of the rows of the outer table (vt_c in this case) appear in the result whether or not they satisfy the predicate (vt_p.parentcol=vt_c.childcol) and the projected elements of rows of the inner table (vt_p in this case) that satisfy the predicate. Note that in Query 7 no elements of vt_p are projected. Just as with the inner join described above, the NORMALIZE clause will result in a one-to-one correspondence between the rows of vt_c and vt_p.

Consequently, an optimizer would eliminate the inner table (vt_p, in this case), and thus the outer join, from the query to produce the optimized version of Query 7 shown below:
SEQUENCED VALIDTIME
SELECT vt_c.*
FROM vt_c;

Consider the following query (Query 8) applied to vt_p and vt_c as defined and populated above:

---
SEQUENCED VALIDTIME
  SELECT vt_c.*
    FROM vt_c LEFT OUTER JOIN vt_p
      ON vt_p.parentcol = vt_c.childcol
      NORMALIZE ON MEETS ;
---

The first non-temporal outer join elimination criterion is satisfied because the join column in the inner table (vt_p.parentcol) is guaranteed to be unique because of its definition as VALIDTIME UNIQUE. In fact that definition defines vt_p.parentcol as temporal-unique.

The second non-temporal outer join elimination criterion is satisfied because no information other than the inner table's join column (vt_p.parentcol) is accessed from the inner table.

The third non-temporal outer join elimination criterion is satisfied because the only reference to the inner table join column is in the ON clause.

The fourth non-temporal outer join elimination criterion is satisfied because the join is an equality join (vt_p.parentcol=vt_c.childcol).

The fifth non-temporal outer join elimination criterion is satisfied because the inner table (vt_p) does not participate in any other join in the query.

The first temporal outer join elimination criterion is satisfied because there is a temporal SEQUENCED RI between the outer table (vt_c) as a child table and the inner table (vt_p) as a parent table with the RI on the join column by virtue of the REFERENCES vt_p (parentcol) clause in the definition of vt_c.childcol. This clause creates a temporal SEQUENCED RI between vt_c.childcol and vt_p.parentcol.

The second temporal outer join elimination criterion is satisfied by the NORMALIZE ON MEETS clause in Query 8. Ignoring for a moment the NORMALIZE clause, the left outer join in Query 8 will produce a result that contains all of the rows from vt_c and projected elements from vt_p (of which there are none) from the rows of vt_p that satisfy the predicate (i.e, vt_p.parentcol=vt_c.childcol). The NORMALIZE ON MEETS clause will merge the rows in the result that have ValidTime columns that MEET, resulting in a final result that is identical to the vt_c table.

Consequently, an optimizer analyzing Query 8 will eliminate vt_p, and thus the outer join, from the query: to produce the optimized version of Query 8 shown below:
SEQUENCED VALIDTIME
SELECT vt_c.*
FROM vt_c;

Optimization of SEQUENCED Outer Join—Transaction-Time Tables

Consider the following query (Query 9) applied to tt_p and tt_c as defined and populated above:

---
SEQUENCED TRANSACTIONTIME
  SELECT tt_c.*
    FROM tt_c LEFT OUTER JOIN tt_p NORMALIZE
      (parentcol, ttcol1) ON MEETS
      ON tt_p.parentcol=tt_c.parentcol;
---

The first non-temporal outer join elimination criterion is satisfied because the join column in the inner table (tt_p.parentcol) is guaranteed to be unique because of its definition as VALIDTIME UNIQUE. In fact that definition defines tt_p.parentcol as temporal-unique.

The second non-temporal outer join elimination criterion is satisfied because no information other than the inner table's join column (tt_p.parentcol) is accessed from the inner table by the join.

The third non-temporal outer join elimination criterion is satisfied because the only reference in the join to the inner table join column is in the ON clause.

The fourth non-temporal outer join elimination criterion is satisfied because the join is an equality join (tt_p.parentcol=tt_c.childcol).

The fifth non-temporal outer join elimination criterion is satisfied because the inner table (tt_p) does not participate in any other join in the query.

The first temporal outer join elimination criterion is satisfied because there is a temporal SEQUENCED RI between the outer table (tt_c) as a child table and the inner table (tt_p) as a parent table with the RI on the join column by virtue of the REFERENCES tt_p (parentcol) clause in the definition of tt_c.childcol. This clause creates a temporal SEQUENCED RI between tt_c.childcol and tt_p.parentcol.

The second temporal outer join elimination criterion is satisfied by the NORMALIZE ON MEETS clause in the join in Query 9 for the same reasons discussed above with respect to Query 7.

Consequently, an optimizer analyzing Query 9 will eliminate tt_p, and thus the outer join, from the query to produce the optimized version of Query 9 shown below:
SEQUENCED TRANSACTIONTIME
SELECT tt_c.*
FROM tt_c;

Consider the following query (Query 10) applied to tt_p and tt_c as defined and populated above:

---
SEQUENCED TRANSACTIONTIME
  SELECT tt_c.*
    FROM tt_c LEFT OUTER JOIN tt_p
      ON tt_p.parentcol = tt_c.childcol NORMALIZE ON
      MEETS;
---

The first non-temporal outer join elimination criterion is satisfied because the join column in the inner table (tt_p.parentcol) is guaranteed to be unique because of its definition as TRANSACTIONTIME UNIQUE. In fact that definition defines tt_p.parentcol as temporal-unique.

The second non-temporal outer join elimination criterion is satisfied because no information other than the inner table's join column (tt_p.parentcol) is accessed from the inner table by the join.

The third non-temporal outer join elimination criterion is satisfied because the only reference in the join to the inner table join column is in the ON clause.

The fourth non-temporal outer join elimination criterion is satisfied because the join is an equality join (tt_p.parentcol=tt_c.childcol).

The fifth non-temporal outer join elimination criterion is satisfied because the inner table (tt_p) does not participate in any other join in the query.

The first temporal outer join elimination criterion is satisfied because there is a temporal SEQUENCED RI between the outer table (tt_c) as a child table and the inner table (tt_p) as a parent table with the RI on the join column by virtue of the REFERENCES tt_p (parentcol) clause in the definition of tt_c.childcol. This clause creates a temporal SEQUENCED RI between tt_c.childcol and tt_p.parentcol.

The second temporal outer join elimination criterion is satisfied by the NORMALIZE ON MEETS clause in Query 10 for the same reasons discussed above with respect to Query 8.

An optimizer analyzing Query 10 will eliminate tt_p, and thus the outer join, from the query to produce the optimized version of Query 10 shown below:

SEQUENCED TRANSACTIONTIME
SELECT tt_c.*
FROM tt_c;

Optimization of SEQUENCED Inner Join—Bi-Temporal Tables

The same principles apply to bi-temporal tables.

Operation

Figure 4:
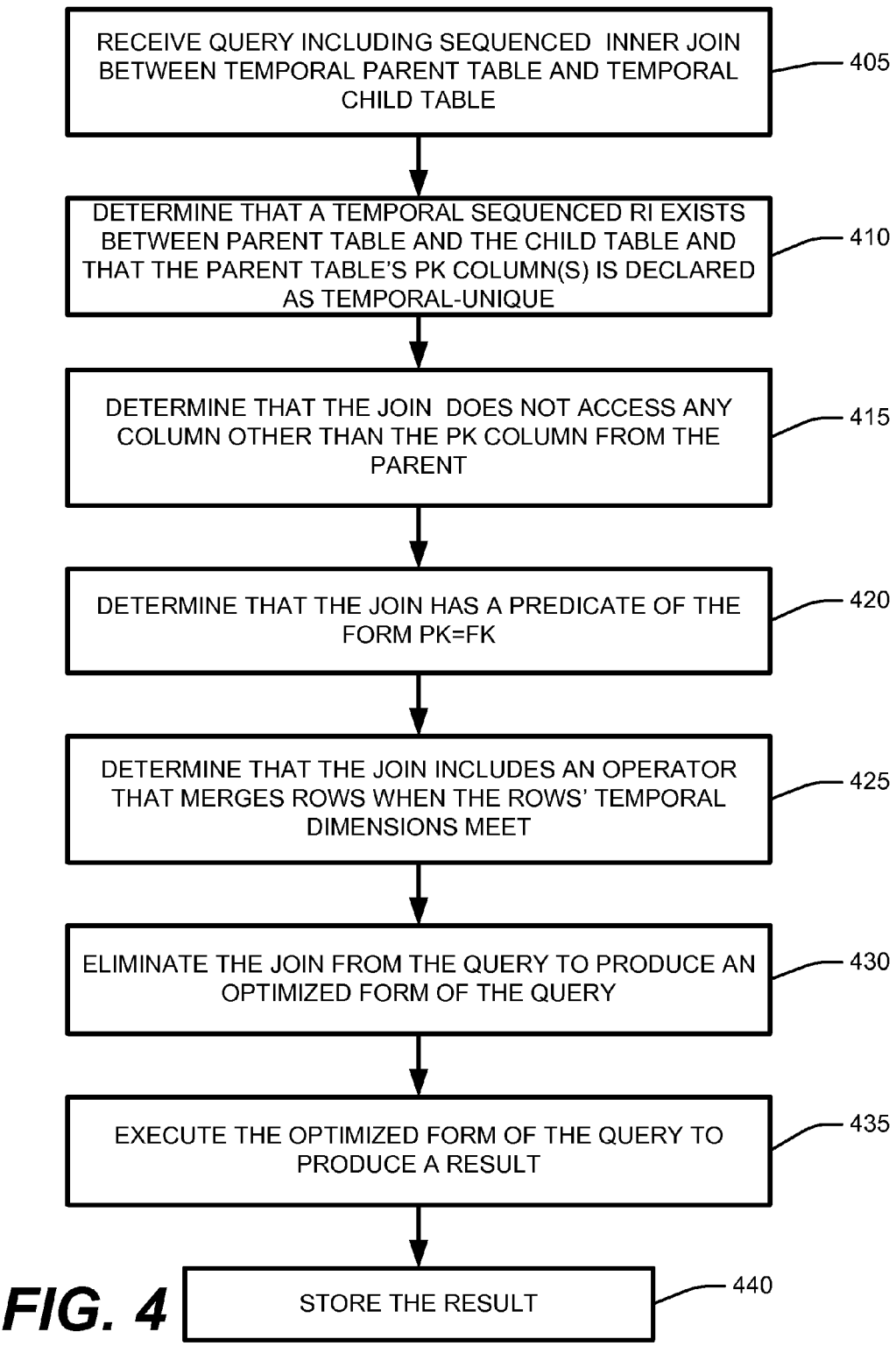
FIGS. 4 and 5 are flow charts.

In one embodiment of operation, as shown in FIG. 4, the process begins by receiving a query that includes a SEQUENCED inner join between a temporal parent table and a temporal child table (block 405). In one embodiment, the parent table has a plurality of rows and the child table has a plurality of rows. In one embodiment, the parent table has a Parent Key ("PK") column having a value for each row. In one embodiment, the parent table has a temporal dimension, such as a ValidTime dimension and/or a TransactionTime dimension. In one embodiment, the child table has a Foreign Key ("FK") column having a value for each row. In one embodiment, the child table has a temporal dimension, such as a ValidTime dimension and/or a TransactionTime dimension.

In one embodiment, the process determines that a temporal SEQUENCED RI constraint exists between the parent table and the child table such that every FK value in the child exists as a PK value in the parent at the same time and that the PK value is declared as temporal-unique (block 410).

In one embodiment, the process determines that the join does not access any column other than the PK column from the parent (block 415).

In one embodiment, the process determines that the join has a predicate of the form PK=FK (block 420).

In one embodiment, the process determines that the join includes an operator that merges rows when the rows' temporal dimensions meet (block 425). In one embodiment, the operator coalesces rows in the parent table. In one embodiment, the operator coalesces rows in the result.

Upon making these determinations, the process eliminates the join from the query to produce an optimized form of the query (block 430). The process executes the optimized form of the query to produce the result (block 435) and stores the result (block 440).

Figure 5:
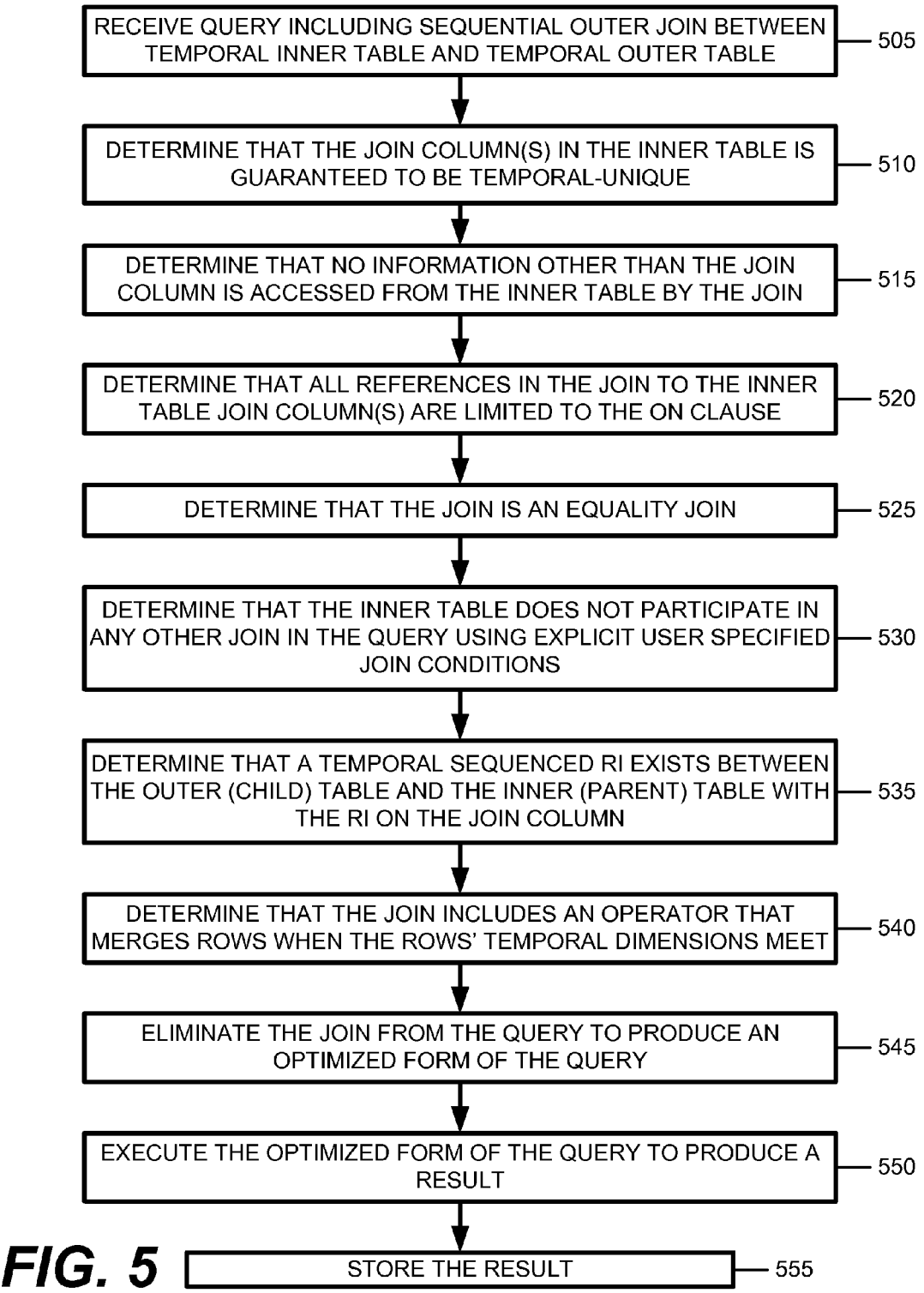

In one embodiment of operation, as shown in FIG. 5, the process begins by receiving a query that includes a SEQUENCED outer join between a temporal parent table and a temporal child table (block 505). In one embodiment, the parent table has a plurality of rows and the child table has a plurality of rows. In one embodiment, the parent table has a Parent Key ("PK") column having a value for each row. In one embodiment, the parent table has a temporal dimension, such as a ValidTime dimension and/or a TransactionTime dimension. In one embodiment, the child table has a Foreign Key ("FK") column having a value for each row. In one embodiment, the child table has a temporal dimension, such as a ValidTime dimension and/or a TransactionTime dimension.

In one embodiment, the process determines that the join column(s) in the inner table is guaranteed to be temporal-unique (block 510).

In one embodiment, the process determines that no information other than the join column is accessed from the inner table by the join (block 515).

In one embodiment, the process determines that all references in the join to the inner table join column(s) are limited to the ON clause (block 520).

In one embodiment, the process determines that the join is an equality join (block 525).

In one embodiment, the process determines that the inner table does not participate in any other join in the query using explicit user specified join conditions (block 530).

In one embodiment, the process determines that a temporal SEQUENCED RI exists between the outer (child) table and the inner (parent) table with the temporal SEQUENCED RI being on the join column (block 535).

In one embodiment, the process determines that the join includes an operator that merges rows when the rows' temporal dimensions meet (block 540). In one embodiment, the operator coalesces rows in the parent table. In one embodiment, the operator coalesces rows in the result.

In one embodiment, upon making these determinations, the process eliminates the join from the query to produce an optimized form of the query (block 545).

In one embodiment, the process executes the optimized form of the query to produce a result (block 550).

In one embodiment, the process stores the result (block 555).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method comprising:
   receiving, by the computer, a query for optimization, the query including a SEQUENCED join between a temporal parent table and a temporal child table, the parent table having one or more rows;
   the child table having one or more rows;
   the parent table having a Primary Key ("PK") column having a value for each row;
   the parent table having a temporal dimension, the parent table's temporal dimension having a value for each row;
   the child table having a Foreign Key ("FK") column having a value for each row;

the child table having a temporal dimension, the child table's temporal dimension having a value for each row;
determining, by the computer, that the query, the parent table, the child table, and the join satisfy a set of CURRENT temporal join elimination criteria;
determining, by the computer, that the query, the parent table, the child table, and the join satisfy a set of SEQUENCED temporal join elimination criteria, and in response:
eliminating, by the computer, the join from the query to produce an optimized form of the query;
wherein the join is a SEQUENCED inner join;
the set of CURRENT temporal join elimination criteria comprises:
the existence of temporal referential integrity ("RI") between the temporal parent table and the temporal child table such that every FK value in the temporal child table exists as a PK value in the parent at the same time;
the PK being declared as temporal-unique;
the join not accessing any column other than PK columns from the temporal parent table;
the join having a predicate of the form PK=FK;
executing, by the computer, the optimized form of the query to produce a result, the result having one or more rows, the result having one or more projected columns, the projected columns having values, the result having a temporal dimension, the result's temporal dimension having a value; and
storing the result in a memory by the computer.

2. The method of claim 1 wherein the set of SEQUENCED temporal join elimination criteria comprises:
the join including a mechanism to coalesce parent rows having the same value in a parent join column into a single row having a temporal dimension value equal to the merged temporal dimension values of the merged rows.

3. The method of claim 1 wherein the set of SEQUENCED temporal join elimination criteria comprises:
the join including a mechanism to coalesce result rows having the same value in projected columns into a single row having a temporal dimension value equal to the merged temporal dimension values of the merged rows.

4. The method of claim 1 wherein the set of SEQUENCED temporal join elimination criteria comprises:
the join including a NORMALIZE ON MEETS clause applied to the parent table.

5. The method of claim 1 wherein the set of SEQUENCED temporal join elimination criteria comprises:
the join including a NORMALIZE ON MEETS clause applied to the result.

6. The method of claim 1 wherein:
the join is a SEQUENCED outer join, with the parent table being the inner table and the child table being the outer table;
the set of CURRENT temporal join elimination criteria comprises:
a temporal parent column in a predicate of the SEQUENCED outer join being temporal-unique;
the temporal parent column is the only information accessed from the temporal parent table by the SEQUENCED outer join;
all reference to the temporal parent column is in an ON clause of the SEQUENCED outer join;
the SEQUENCED outer join is an equality join; and
the parent table is not accessed by any other join in the SEQUENCED outer join.

7. A database system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process to:
receive, by the computer, a query for optimization, the query including a SEQUENCED join between a temporal parent table and a temporal child table,
the parent table having one or more rows;
the child table having one or more rows;
the parent table having a Primary Key ("PK") column having a value for each row;
the parent table having a temporal dimension, the parent table's temporal dimension having a value for each row;
the child table having a Foreign Key ("FK") column having a value for each row;
the child table having a temporal dimension, the child table's temporal dimension having a value for each row;
determine, by the computer, that the query, the parent table, the child table, and the join satisfy a set of CURRENT temporal join elimination criteria;
determine, by the computer, that the query, the parent table, the child table, and the join satisfy a set of SEQUENCED temporal join elimination criteria, and in response:
eliminate, by the computer, the join from the query to produce an optimized form of the query;
wherein the join is a SEQUENCED inner join;
the set of CURRENT temporal join elimination criteria comprises:
the existence of temporal referential integrity ("RI") between the temporal parent table and the temporal child table such that every FK value in the temporal child table exists as a PK value in the parent at the same time;
the PK being declared as temporal-unique;
the join not accessing any column other than PK columns from the temporal parent table; and
the join having a predicate of the form PK=FK;
execute, by the computer, the optimized form of the query to produce a result, the result having one or more rows, the result having one or more projected columns, the projected columns having values, the result having a temporal dimension, the result's temporal dimension having a value; and
store the result in a memory by the computer.

8. The database system of claim 7 wherein the set of SEQUENCED temporal join elimination criteria comprises:
the join including a mechanism to coalesce parent rows having the same value in a parent join column into a single row having a temporal dimension value equal to the merged temporal dimension values of the merged rows.

9. The database system of claim 7 wherein the set of SEQUENCED temporal join elimination criteria comprises:
the join including a mechanism to coalesce result rows having the same value in projected columns into a single row having a temporal dimension value equal to the merged temporal dimension values of the merged rows.

10. The database system of claim 7 wherein the set of SEQUENCED temporal join elimination criteria comprises:
the join including a NORMALIZE ON MEETS clause applied to the parent table.

11. The database system of claim 7 wherein the set of SEQUENCED temporal join elimination criteria comprises:
the join including a NORMALIZE ON MEETS clause applied to the result.

12. The database system of claim 7 wherein:
the join is a SEQUENCED outer join, with the parent table being the inner table and the child table being the outer table;
the set of CURRENT temporal join elimination criteria comprises:
a temporal parent column in a predicate of the SEQUENCED outer join being temporal-unique;
the temporal parent column is the only information accessed from the temporal parent table by the SEQUENCED outer join;
all reference to the temporal parent column is in an ON clause of the SEQUENCED outer join;
the SEQUENCED outer join is an equality join; and
the parent table is not accessed by any other join in the SEQUENCED outer join.

13. A computer program, stored in a non-transitory computer-readable tangible medium, the program comprising executable instructions that cause a computer to:
receive, by the computer, a query for optimization, the query including a SEQUENCED join between a temporal parent table and a temporal child table,
the parent table having one or more rows;
the child table having one or more rows;
the parent table having a Primary Key ("PK") column having a value for each row;
the parent table having a temporal dimension, the parent table's temporal dimension having a value for each row;
the child table having a Foreign Key ("FK") column having a value for each row;
the child table having a temporal dimension, the child table's temporal dimension having a value for each row;
determine, by the computer, that the query, the parent table, the child table, and the join satisfy a set of CURRENT temporal join elimination criteria;
determine, by the computer, that the query, the parent table, the child table, and the join satisfy a set of SEQUENCED temporal join elimination criteria, and in response:
eliminate, by the computer, the join from the query to produce an optimized form of the query;
wherein the join is a SEQUENCED inner join;
the set of CURRENT temporal join elimination criteria comprises:
the existence of temporal referential integrity ("RI") between the temporal parent table and the temporal child table such that every FK value in the temporal child table exists as a PK value in the parent at the same time;
the PK being declared as temporal-unique;
the join not accessing any column other than PK columns from the temporal parent table; and
the join having a predicate of the form PK=FK;
execute, by the computer, the optimized form of the query to produce a result, the result having one or more rows, the result having one or more projected columns, the projected columns having values, the result having a temporal dimension, the result's temporal dimension having a value; and
store the result in a memory by the computer.

14. The computer program of claim 13 wherein the set of SEQUENCED temporal join elimination criteria comprises:
the join including a mechanism to coalesce parent rows having the same value in a parent join column into a single row having a temporal dimension value equal to the merged temporal dimension values of the merged rows.

15. The computer program of claim 13 wherein the set of SEQUENCED temporal join elimination criteria comprises:
the join including a mechanism to coalesce result rows having the same value in projected columns into a single row having a temporal dimension value equal to the merged temporal dimension values of the merged rows.

16. The computer program of claim 13 wherein the set of SEQUENCED temporal join elimination criteria comprises:
the join including a NORMALIZE ON MEETS clause applied to the parent table.

17. The computer program of claim 13 wherein the set of SEQUENCED temporal join elimination criteria comprises:
the join including a NORMALIZE ON MEETS clause applied to the result.

* * * * *